May 22, 1956     G. L. GERSHMAN     2,746,158
TAPER MICROMETER
Filed June 24, 1954
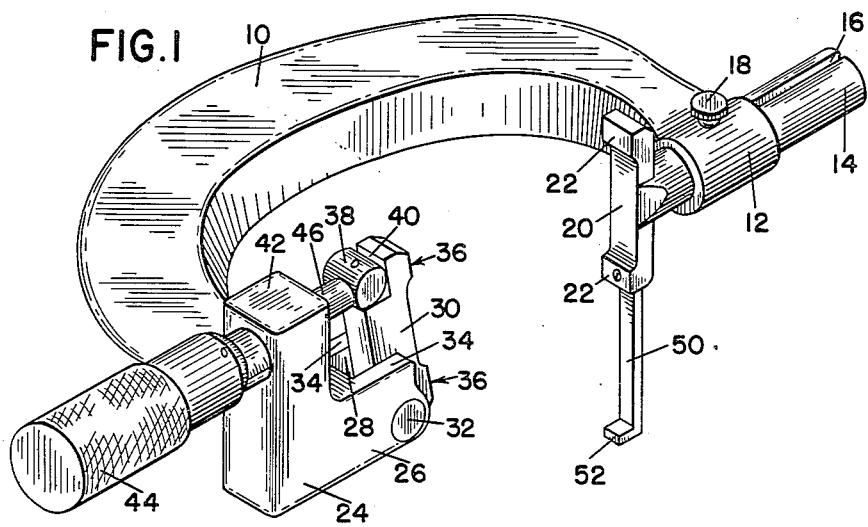
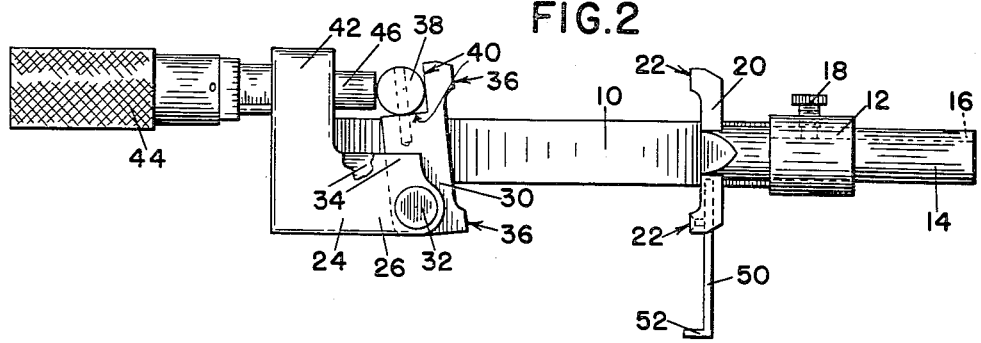
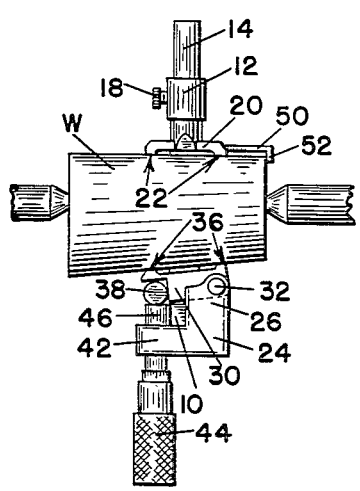
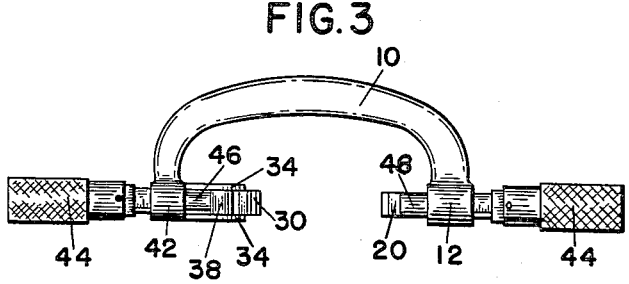
INVENTOR
GEORGE L. GERSHMAN
by Charles R. Fay,
ATTORNEY

United States Patent Office 2,746,158
Patented May 22, 1956

---

2,746,158

TAPER MICROMETER

George L. Gershman, Worcester, Mass.

Application June 24, 1954, Serial No. 438,926

1 Claim. (Cl. 33—174)

This invention relates ot a new and improved taper micrometer by which the taper of an object such as a workpiece in a lathe may be accurately and quickly determined merely by the application of the new micrometer thereto in the manner of a conventional micrometer caliper.

A principal object of the present invention resides in the provision of a micrometer which includes a frame by which it may be handled having at an end thereof a boss or cylinder for the adjustable reception of an anvil or the like for use as a base-point in the measurement to be read and at the other end thereof said frame is provided with a more or less conventional micrometer thimble and scale directly readable in thousandths of an inch or similar measurement, said thimble being engageable with a sine bar which is pivoted to the frame and forms and measures an angle with the anvil aforesaid, the taper of the object being measured being readable in thousandths of an inch or otherwise according to shop practice wherein tapers are usually specified as in thousandths of an inch of similar measurement.

Other objects of the invention include the provision of special structure providing for extreme accuracy in measuring the taper and including a new and improved non-connected engagement between the plunger on the micrometer thimble and the sine bar.

Other objects of the invention include the provision of an attachment for applying a micrometer plunger and thimble in place of the anvil aforesaid for not only reading the taper but also the thickness of the work; and the provision of a longitudinally arranged measuring bar attached to the anvil for determining the exact distance of the point of angle measurement from the end of the work, as well as indicating the taper itself.

Other objects and advantages of the invention will appear hereinafter.

Reference is to be had to the accompanying drawings, in which

Fig. 1 is a perspective view of the device according to the invention;

Fig. 2 is a front view in elevation thereof;

Fig. 3 is a plan view on a reduced scale and showing a modification; and

Fig. 4 is a view on a reduced scale illustrating the device applied to a workpiece in a lathe.

The invention in this case has been illustrated as a structure including a C-shaped bar, frame, or handle 10 at one end of which is provided a hollow boss or cylinder 12 for the sliding and adjustable reception of a rod 14 having a longitudinal slot 16 for the reception of the end of a guiding and clamping screw 18 by which the rod 14 is slidingly adjustably held in non-rotative condition in the boss 12.

At its inner end, the rod 14 is provided with an elongated flat base measuring element 20 which may be referred to as an "anvil" and which is provided with the base feet 22 facing inwardly of the C-shaped handle frame 10.

At the other end of the handle 10, there is provided in fixed relation thereto a block 24 having a lateral extension 26 extending toward the anvil 20 and provided with a groove or slot 28 for the reception of a measuring or sine bar member 30. Sine bar 30 is supported at 32 on an accurately ground pivot-pin located in opposite holes in the legs 34 which are occasioned by the slot 28. The axis of pin 32 is at right angles to the length of anvil 20 and is offset from the axis of rod 14, see Fig. 2. The sine bar 30 is provided with a pair of base measuring feet 36 similar to those at 22 and also with an accurate cylindrical roll indicated at 38. This roll may be secured in accurate position against the shoulder 40 formed by a right-angle notch at the upper end of the bar 30 and may be secured to the bar 30 by a set-screw or other securing means as desired.

The block 24 is provided with an extension 42 in which is secured a more or less conventional micrometer thimble, plunger, etc., generally indicated at 44 and readable in thousandths of an inch as indicated. The plunger 46 of this micrometer has a flat end bearing against but not connected to the barrel 38 and thus engages the cylindrical surface thereof to move the same against a taper workpiece as illustrated in Fig. 4 in order to determine the inclination of the bar 30 out of parallelism with the plane of the two measuring feet 22 of the bar 14.

The axes of pin 32 and roll 38 are always exactly spaced because they are fixed, and this result is provided for by the unconnected engagement between the end of the plunger 46 and the barrel 38, so that the relative inclination of the bar 30 is extremely accurately measurable. If plunger 46 were connected to roll 38, the consequent enforced variability of the parts to allow for pivoting bar 30 would occasion errors that would have to be compensated for in some way. Hence, the accuracy of the relationship between the inclination of the bar 30 and the micrometer plunger is always constant, the cylindrical surface of roll 38 sliding on the flat end face of the plunger.

The rod 14 may be replaced by another micrometer as shown at 48 in Fig. 3, so that not only may the taper of the workpiece be determined, but also the thickness thereof. The bar 20 may be provided with an extension 50 having an end measuring foot 52 to find and locate the end of the workpiece, so that the taper in thousandths of an inch may be accurately read at an accurate distance from the end of the workpiece W (see Fig. 4).

Referring now to Fig. 4, there is shown a workpiece W which may be in a lathe as indicated. In order to find the taper of this workpiece, it is merely necessary to apply the new taper micrometer thereto as shown and to adjust the micrometer thimble 44 so as to bring the measuring feet 36 into engagement with the workpiece diametrically opposite those at 22 on the bar 20. If desired, this measurement may be taken at an exact distance according to bar 50 and the measuring foot 52 from the end of the workpiece, as indicated herein.

Having thus described my invention and the advantages thereof, I do not wish to be limited to the details herein disclosed, otherwise than as set forth in the claim, but what I claim is:

A precision taper micrometer comprising a frame, a trigometrical sine bar pivoted thereon having contact points for engagement with one side of the tapered device to be measured and having a cylindrical sine bar roll whose central axis is parallel to the pivot axis of the sine bar, a direct reading adjustable increment measuring device having a flat face engaging the sine bar roll on the cylindrical surface thereof, and a base member carried by the frame and spaced from the sine bar for contacting the article to be measured on the opposite side from the sine bar, said increment measuring device being rectilinearly movable to position the sine bar for the purpose of providing the desired measurement, said contact points on the sine bar being in a line parallel to a plane passing through the central axis of the sine bar roll and the pivot axis of the sine bar.

References Cited in the file of this patent

UNITED STATES PATENTS

| | | |
|---|---|---|
| 764,203 | Perkins | July 5, 1904 |
| 1,389,381 | Renton | Aug. 30, 1921 |
| 1,398,296 | Goguen | Nov. 29, 1921 |
| 1,643,570 | Bartholdy | Sept. 27, 1927 |
| 2,325,904 | Brebeck | Aug. 3, 1943 |
| 2,494,715 | Mathews | Jan. 17, 1950 |
| 2,500,558 | Maxwell | Mar. 14, 1950 |
| 2,512,863 | Kapuczin | June 27, 1950 |
| 2,639,511 | Whiteman | May 26, 1953 |

FOREIGN PATENTS

| | | |
|---|---|---|
| 710,881 | Germany | Sept. 23, 1941 |